US011881625B1

(12) United States Patent
Cencich et al.

(10) Patent No.: US 11,881,625 B1
(45) Date of Patent: Jan. 23, 2024

(54) PHASED ARRAY FEED REFLECTOR COLLAR AND PARACONIC GROUND PLANE

(71) Applicant: Lockheed Martin Corporation, Bethesda, MD (US)

(72) Inventors: Thomas Patrick Cencich, Littleton, CO (US); Thomas Henry Hand, Highlands Ranch, CO (US); Joshua David Gustafson, Castle Rock, CO (US); W. Neill Kefauver, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/495,700

(22) Filed: Oct. 6, 2021

Related U.S. Application Data

(60) Provisional application No. 63/088,364, filed on Oct. 6, 2020.

(51) Int. Cl.
*H01Q 15/14* (2006.01)
*H01Q 19/17* (2006.01)
*H01Q 19/10* (2006.01)

(52) U.S. Cl.
CPC ........... *H01Q 15/14* (2013.01); *H01Q 19/102* (2013.01); *H01Q 19/17* (2013.01)

(58) Field of Classification Search
CPC ................. H01Q 15/14-22; H01Q 19/10-195
See application file for complete search history.

(56) References Cited

U.S. PATENT DOCUMENTS 2,549,143 A * 4/1951 Tinus .................. H01Q 19/102
343/781 R
4,005,433 A * 1/1977 Tsuda .................. H01Q 19/134
343/819
4,263,599 A * 4/1981 Bielli ..................... H01Q 19/13
343/781 R
4,626,863 A * 12/1986 Knop .................. H01Q 19/026
343/838

(Continued)

FOREIGN PATENT DOCUMENTS

CN 106099376 A * 11/2016 ............... H01Q 1/38
CN 106654600 A * 5/2017 ............... H01Q 1/36
WO WO-02097923 A1 * 12/2002 ............ H01Q 15/18

*Primary Examiner* — Ab Salam Alkassim, Jr.
(74) *Attorney, Agent, or Firm* — BAKERHOSTETLER

(57) ABSTRACT

A reflector antenna includes a reflector having a curved reflecting surface that extends around a longitudinal center axis, wherein the curved reflecting surface is defined by rotating a concave curve around the longitudinal center axis and wherein one end of the concave curve defines an apex on the longitudinal center axis. The reflector antenna may further include a ground plane extension having a flat reflecting surface abutting an edge of the reflector and extending radially away from the longitudinal center axis. A phased array feed may be arranged spaced apart from and opposite to the reflecting surfaces of the reflector and the ground plane extension. A tapered collar may be arranged adjacent to the phased array feed, wherein the tapered collar tapers outward away from the phased array feed and towards the reflector, and wherein the tapered collar comprises an inner reflective surface facing the reflector.

19 Claims, 8 Drawing Sheets

(56) References Cited

U.S. PATENT DOCUMENTS 4,672,387 A * 6/1987 Waddoup ............. H01Q 17/001 343/781 P
4,740,791 A * 4/1988 Darbowitch ......... H01Q 19/102 342/368
4,804,972 A * 2/1989 Schudel ................... H01Q 1/42 343/915
4,825,222 A * 4/1989 Butcher ............... H01Q 17/001 343/781 P
4,836,328 A * 6/1989 Ferralli .................. H04R 1/345 381/160
5,041,840 A * 8/1991 Cipolla ................... H01P 1/173 343/781 R
5,486,838 A * 1/1996 Dienes ................. H01Q 17/001 343/781 CA
5,793,001 A * 8/1998 Ferralli .................. H04R 1/345 181/175
6,081,234 A * 6/2000 Huang ..................... H01Q 3/14 343/757
6,611,238 B1 * 8/2003 Santoru .................. H01Q 13/02 343/840
6,724,349 B1 * 4/2004 Baird ..................... H01Q 19/19 343/781 R
6,844,862 B1 * 1/2005 Cencich ................. H01Q 13/00 343/781 R
8,750,709 B1 * 6/2014 Schaffner .................. H01P 5/12 398/115
9,054,414 B2 * 6/2015 Mizzoni ............... H01Q 19/192
10,658,756 B1 * 5/2020 Marrero-Fontanez ....................... H01Q 1/288
2001/0005180 A1 * 6/2001 Karlsson .............. H01Q 19/134 343/781 CA
2005/0140563 A1 * 6/2005 Eom .................... H01Q 3/2658 343/840
2005/0237266 A1 * 10/2005 Durham ............... H01Q 3/2658 343/756
2008/0117114 A1 * 5/2008 Haziza ................... H01Q 13/00 343/786
2012/0081266 A1 * 4/2012 Graber ................... G02B 27/30 343/912
2012/0242539 A1 * 9/2012 Mizzoni ............... H01Q 15/147 342/354
2015/0084821 A1 * 3/2015 Rao ...................... H01Q 19/193 343/781 CA
2017/0229773 A1 * 8/2017 Lee ........................ H01Q 1/523
2017/0288769 A1 * 10/2017 Miller .................... H04B 7/212
2018/0343049 A1 * 11/2018 Efe ........................ H01Q 25/00
2019/0131704 A1 * 5/2019 Urzhumov ............. H01Q 19/08
2020/0153105 A1 * 5/2020 Lu ...................... H01Q 13/0208
2021/0376480 A1 * 12/2021 Brandau ................ H01Q 13/06
2022/0045433 A1 * 2/2022 Bhattacharyya ....... H01Q 15/18
2022/0149536 A1 * 5/2022 Hou ....................... H01Q 1/288
2023/0187843 A1 * 6/2023 Biswas ................ H01Q 19/062 343/702

* cited by examiner

PHASED ARRAY FEED REFLECTOR COLLAR AND PARACONIC GROUND PLANE

This application claims the benefit of U.S. Provisional Application No. 63/088,364 titled PHASED ARRAY FEED REFLECTOR SHROUD AND PARACONIC GROUND PLANE and filed on Oct. 6, 2020, which is hereby incorporated by reference herein.

STATEMENT REGARDING FEDERALLY SPONSORED RESEARCH OR DEVELOPMENT

Not Applicable.

TECHNICAL FIELD

The present description relates in general to antennas including, for example, reflector antennas with phased array feeds.

BACKGROUND OF THE DISCLOSURE

The description provided in the background section should not be assumed to be prior art merely because it is mentioned in or associated with the background section. The background section may include information that describes one or more aspects of the subject technology.

Spacecraft often include one or more antennas, for transmitting and receiving information. Often the antennas included on the spacecraft are reflector antennas. Design considerations for reflector antennas include tradeoffs in size, weight and price when seeking to improve efficiency of the antenna.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The subject technology concerns the design of reflector antennas to improve efficiency. For example, a reflector antenna may include a paraconic reflector with a ground plane extension extending away from the periphery of the paraconic reflector to improve the antenna's efficiency. In addition, the reflector antenna may include a tapered collar arranged adjacent to a phased array feed of the reflector antenna to improve antenna efficiency while allowing the size of the phased array feed to be minimized. These solutions have the advantage of being passive solutions that add minimal cost and complexity to the overall design of the reflector antenna while improving the efficiency of the antenna.

Figure 1:
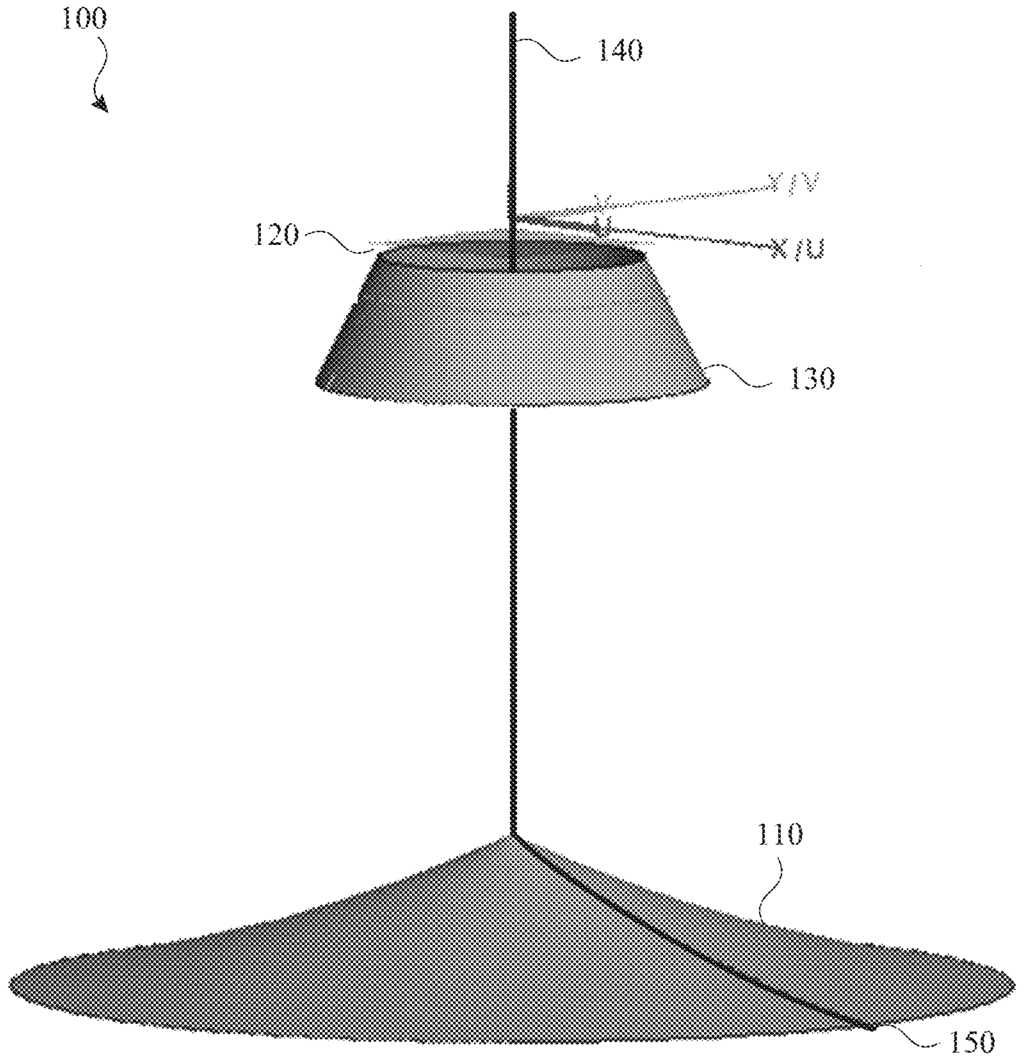
FIG. 1 is a diagram illustrating a reflector antenna according to aspects of the subject technology.

FIG. 1 is a diagram illustrating a reflector antenna according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 1, reflector antenna 100 includes reflector 110, phased array feed 120, and collar 130. Reflector 110 includes a reflective surface configured to reflect radiation beams received by phased array feed 120. The reflective surface of reflector 110 extends around longitudinal center axis 140 and may be defined by rotating a concave curve, such as curve 150, around longitudinal center axis 140. An end of curve 150 defines an apex on longitudinal center axis 140 such that the reflective surface of reflector 110 forms a paraconic shape.

Phased array feed 120 is arranged spaced apart from and opposite to reflector 110 along longitudinal center axis 140. Phased array feed 120 may be centered on longitudinal center axis 140. Collar 130 is adjacent to phased array feed 120 and is discussed in further detail below. Phased array feed 120 may be supported opposite reflector 110 by a post (not shown) positioned along longitudinal center axis 140 or by a support structure that mounts either to the edges of reflector 110 or to a spacecraft or other structure to which reflector antenna 100 is mounted.

Figure 2:
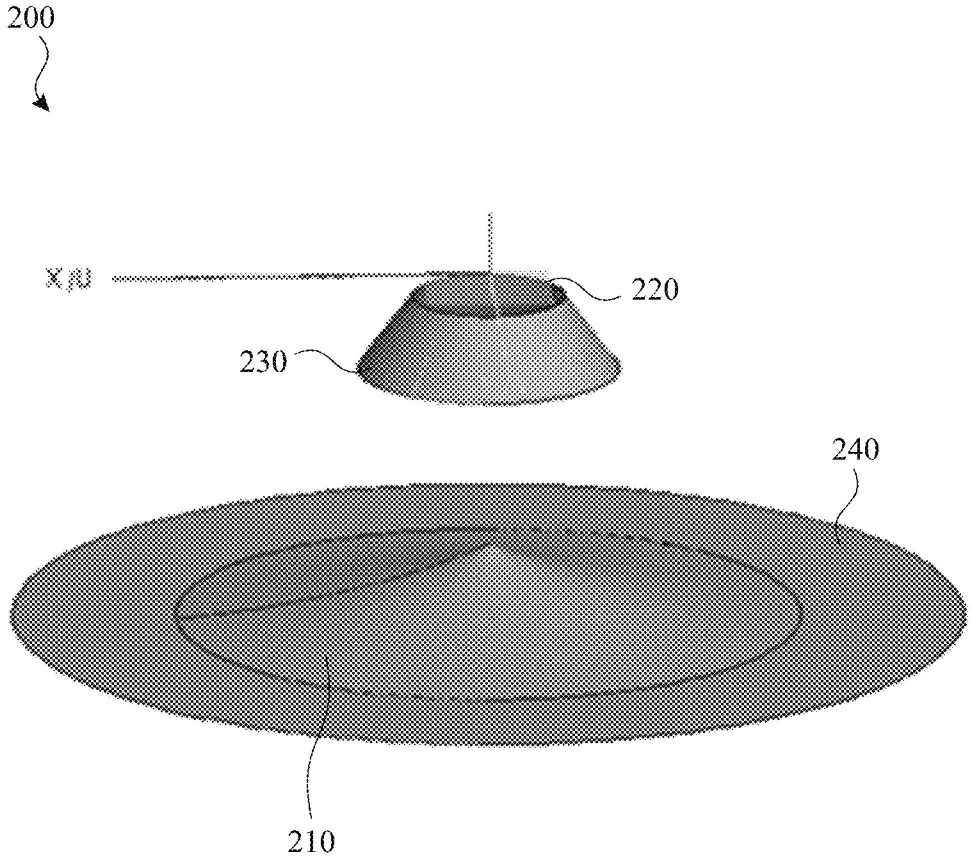
FIG. 2 is a diagram illustrating a reflector antenna with a ground plane extension according to aspects of the subject technology.

FIG. 2 is a diagram illustrating a reflector antenna with a ground plane extension according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 2, reflector antenna 200 includes reflector 210, phased array feed 220, collar 230, and ground plane extension 240. Similar to FIG. 1, reflector 210 is a paraconic reflector configured to reflect radiation beams received by phased array feed 220. In the example depicted in FIG. 2, ground plane extension 240 abuts and encircles the periphery of reflector 210 extending radially away from the longitudinal center axis (not shown in this figure) such that there is a smooth transition from the paraconic reflective surface of reflector 210 to a flat reflective surface of ground plane extension 240. Reflector 210 and ground plane extension 240 may be made of the same reflective material or they may be made of different reflective material. In certain aspects of the subject technology, reflector 210 and ground plane extension 240 may be formed from the same piece of material to form a single, continuous reflective surface.

As depicted in FIG. 2, ground plane extension 240 may be circular in shape and concentric with reflector 210. However, the subject technology is not limited to this configuration and ground plane extension 240 may have other shapes besides circular. The shape of the ground plane extension may be square, rectangular, or any shape that is available on a flat surface surrounding the reflector antenna in its mounted position. For example, when mounted on the bus side panel of a satellite, the reflector antenna may be mounted such that the reflective surface of the reflector is flush with the reflective flat surface of the bus side panel of the satellite. The phased array feed can compensate for phase errors if there are small imperfections in the flat surface of the ground plane extension.

Figure 3:
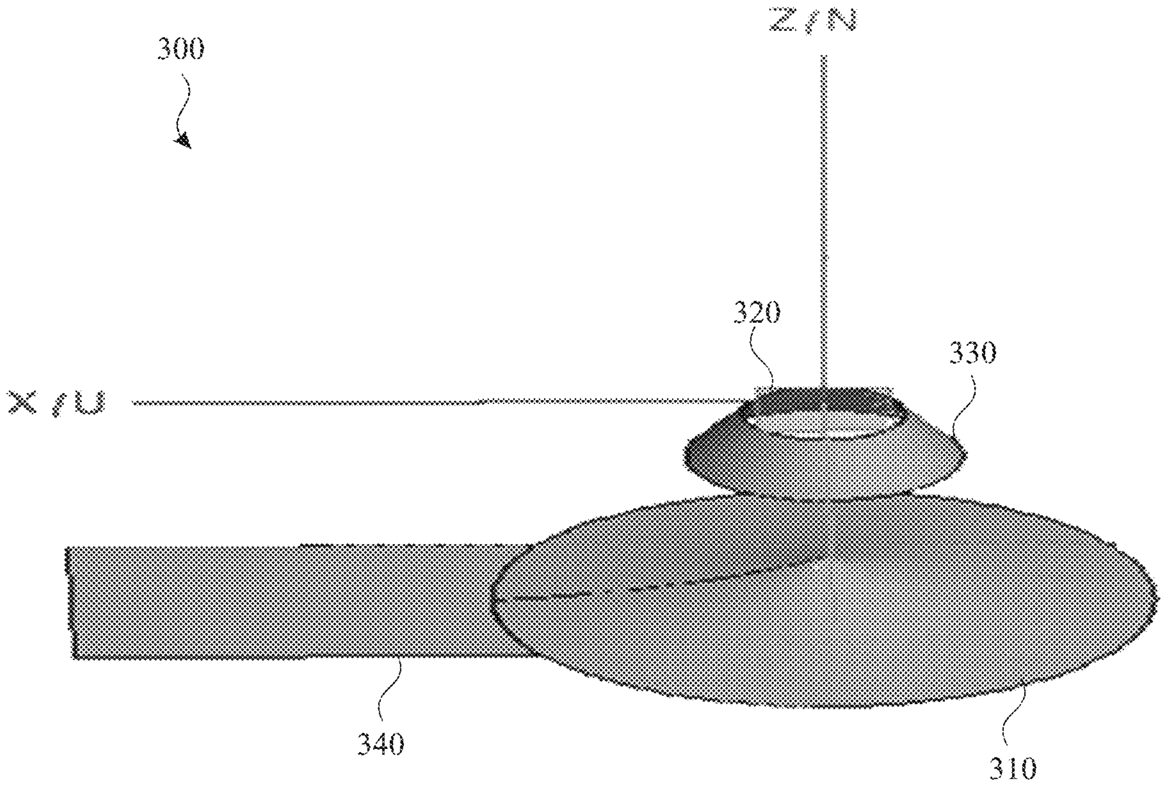
FIG. 3 is a diagram illustrating a reflector antenna with a ground plane extension according to aspects of the subject technology.

Ground plane extension 240 is depicted in FIG. 2 as encircling the entire periphery of reflector 210. According to aspects of the subject technology, the ground plane extension may not encircle the entire periphery of the reflector. FIG. 3 is a diagram illustrating a reflector antenna with a ground plane extension from only a portion of the reflector periphery according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 3, reflector antenna 300 includes reflector 310, phased array feed 320, collar 330, and ground plane extension 340. Similar to FIG. 1, reflector 310 is a paraconic reflector configured to reflect radiation beams received by phased array feed 320. If the ground plane extension is unable to surround the entire periphery of the reflector, or the chosen design does not call for the ground plane extension to surround the entire periphery of the reflector, the advantages of the ground plane extension may still be obtained by extending the ground plane extension from a portion of the periphery in a direction in azimuth from which the radiation beams originate. As depicted in FIG. 3, ground plane extension 340 is extending in a single direction from a portion of the periphery of reflector 310. Ground plane extension 340 is shown with a rectangular shape, however, the shape of ground plane extension 340 is not limited to this shape and may be implemented using other shapes.

FIGS. 1, 2, and 3 are depicted with tapered collars adjacent to the phased array feeds. The subject technology is not limited to this arrangement and the reflector antennas may be implemented without the tapered collar.

Figure 4:
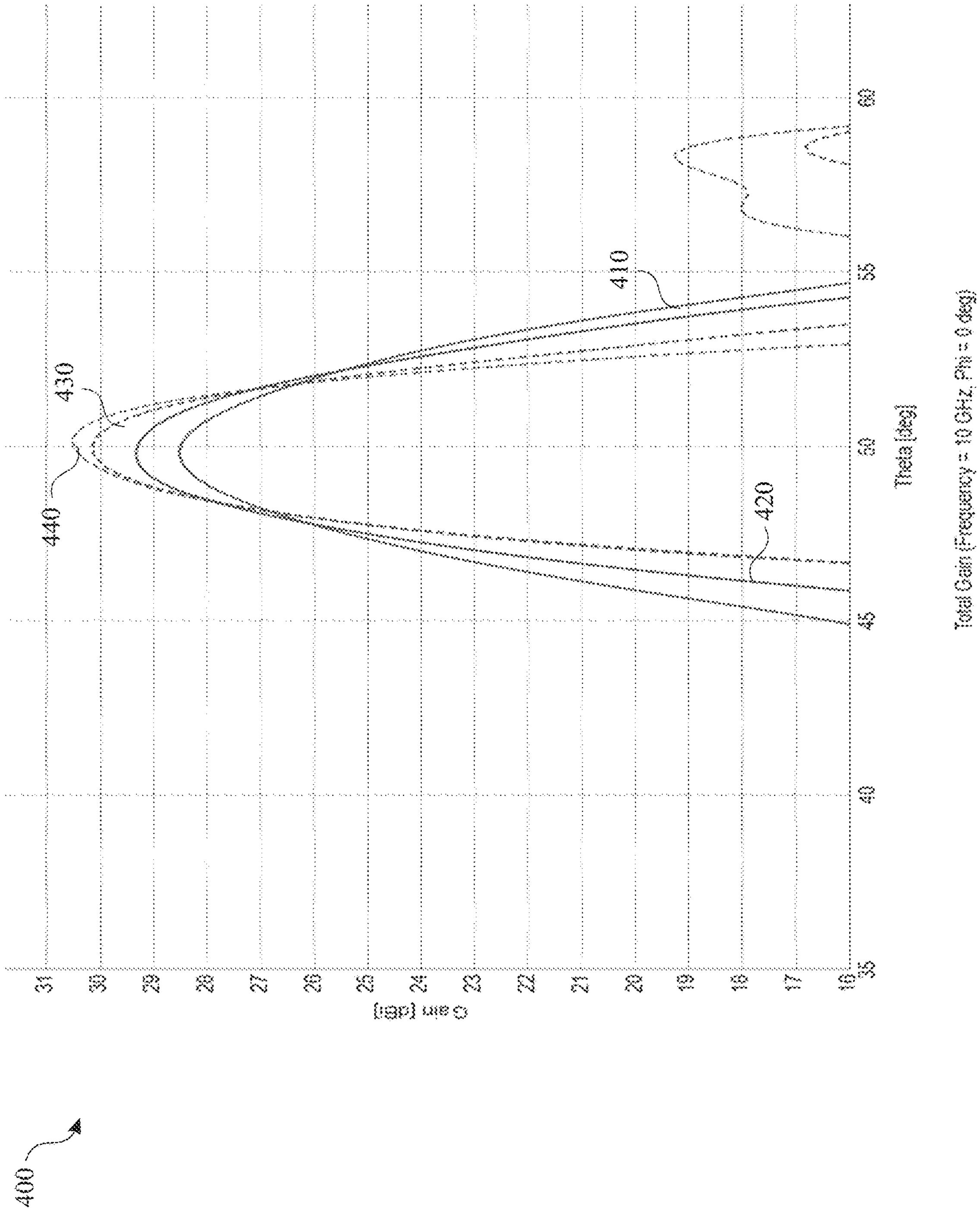
FIG. 4 is a graph depicting antenna gains for reflector antennas with and without a ground plane extension according to aspects of the subject technology.

Adding the ground plane extension to the reflector may improve the gain and directivity of the radiation beam. FIG. 4 is a graph illustrating improvements in gain for different version of the ground plane extension according to aspects of the subject technology. Curve 410 illustrates the gain for a reflector antenna having a reflector with a 40-inch diameter and no ground plane extension. Curve 420 illustrates the gain for a reflector antenna having a reflector with a 40-inch diameter and a 5-inch ground plane extension around the periphery of the reflector for a total diameter of 50 inches. In this configuration, gain improves from 28.5 dB to 29.3 dB. Curve 430 illustrates the gain for a reflector antenna having a reflector with a 40-inch diameter and a 10-inch ground plane extension around the periphery of the reflector for a total diameter of 60 inches. In this configuration, the gain improves to 30.1 dB. Finally, curve 440 illustrates the gain for a reflector antenna having a reflector with a 40-inch diameter and a rectangular ground plane extension extending 30 inches in a direction from a portion the periphery of the reflector as depicted in FIG. 3. In this configuration, the gain improves to 30.5 dB.

Figure 5A:
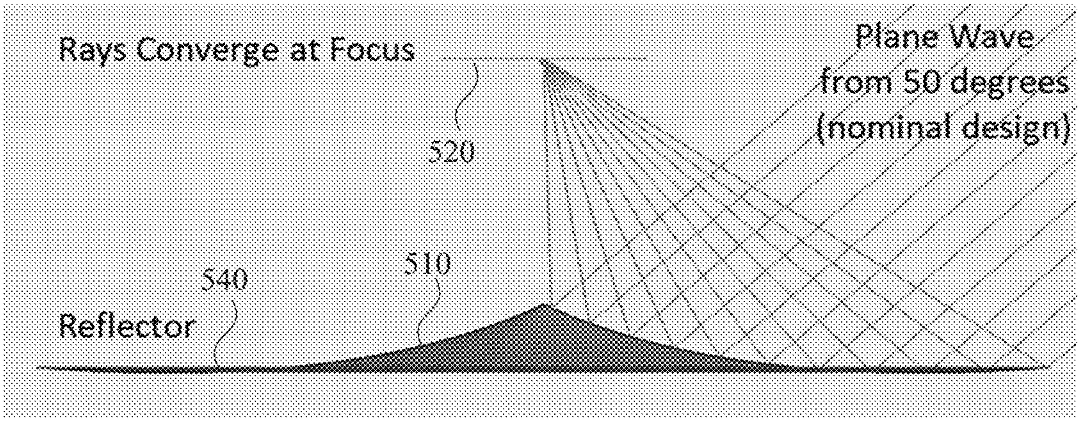
FIGS. 5A, 5B, and 5C are diagrams illustrating plane waves at different scan angles relative to a reflector antenna according to aspects of the subject technology.
Figure 5B:
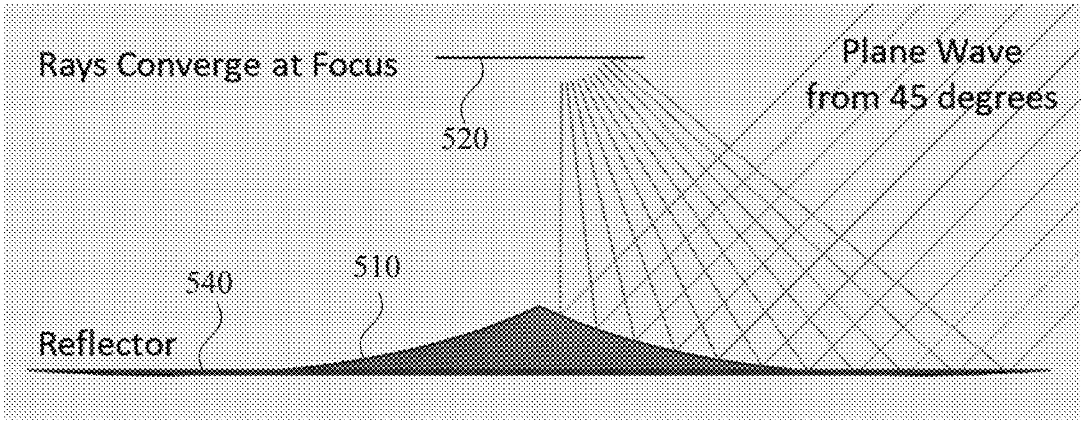
Figure 5C:
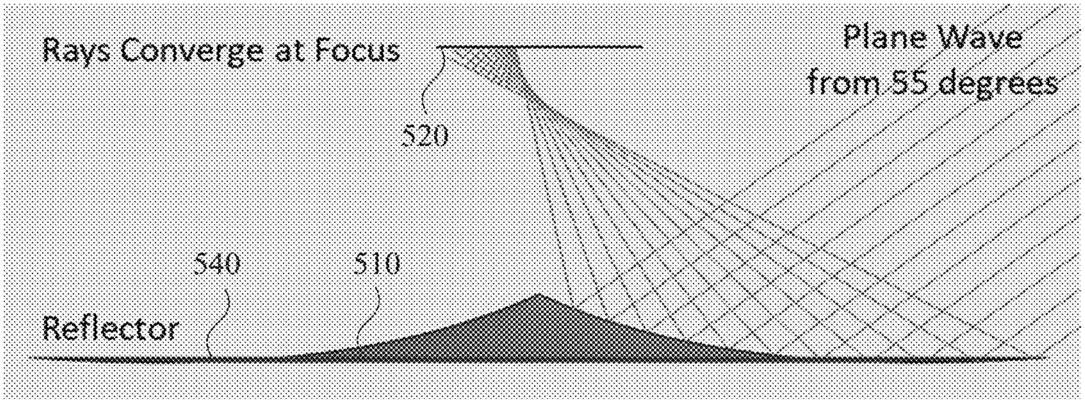

FIGS. 5A, 5B, and 5C illustrate the focal fields of a plane wave reflecting off of reflector 510 and ground plane extension 540 into phased array feed 520. FIG. 5A illustrates the reflection of the plane wave at a scan angle of 50 degrees, which is the nominal design for this example. As illustrated, the rays of the plane waive converge at the focus of reflector 510 and ground plane extension 540. However, as the scan angle shifts from the nominal design of 50 degrees, the focal fields end up on different sides of the focus as illustrated in FIG. 5B for a scan angle of 45 degrees and in FIG. 5C for a scan angle of 55 degrees. As the plane wave is scanned further from the nominal design of 50 degrees, the size of phased array feed 520 should be larger to capture as many rays as possible to engage as many elements of phased array feed 520 as possible. However, a larger phased array feed adds additional weight and expense to a design and therefore may not be optimal.

Figure 6A:
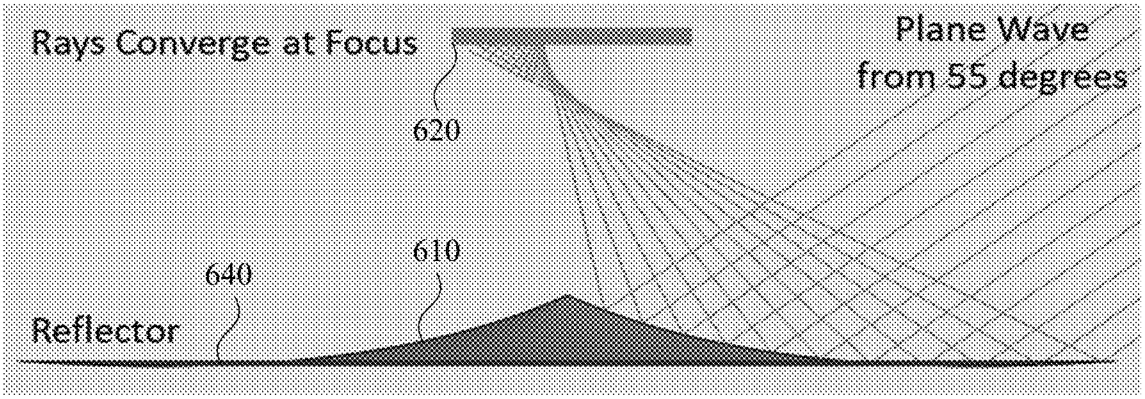
FIGS. 6A and 6B are diagrams illustrating reflector antennas with and without a tapered collar according to aspects of the subject technology.
Figure 6B:
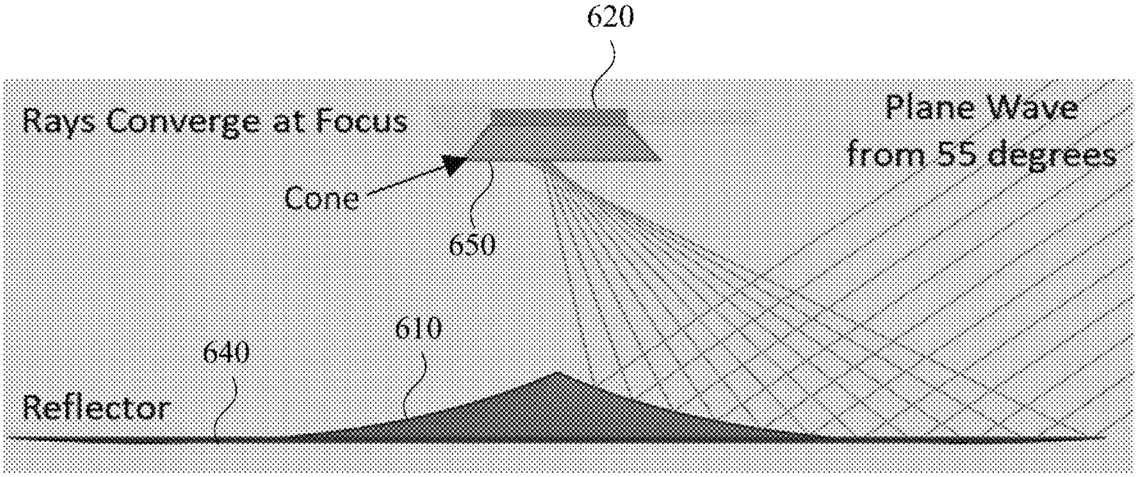
Figure 7:
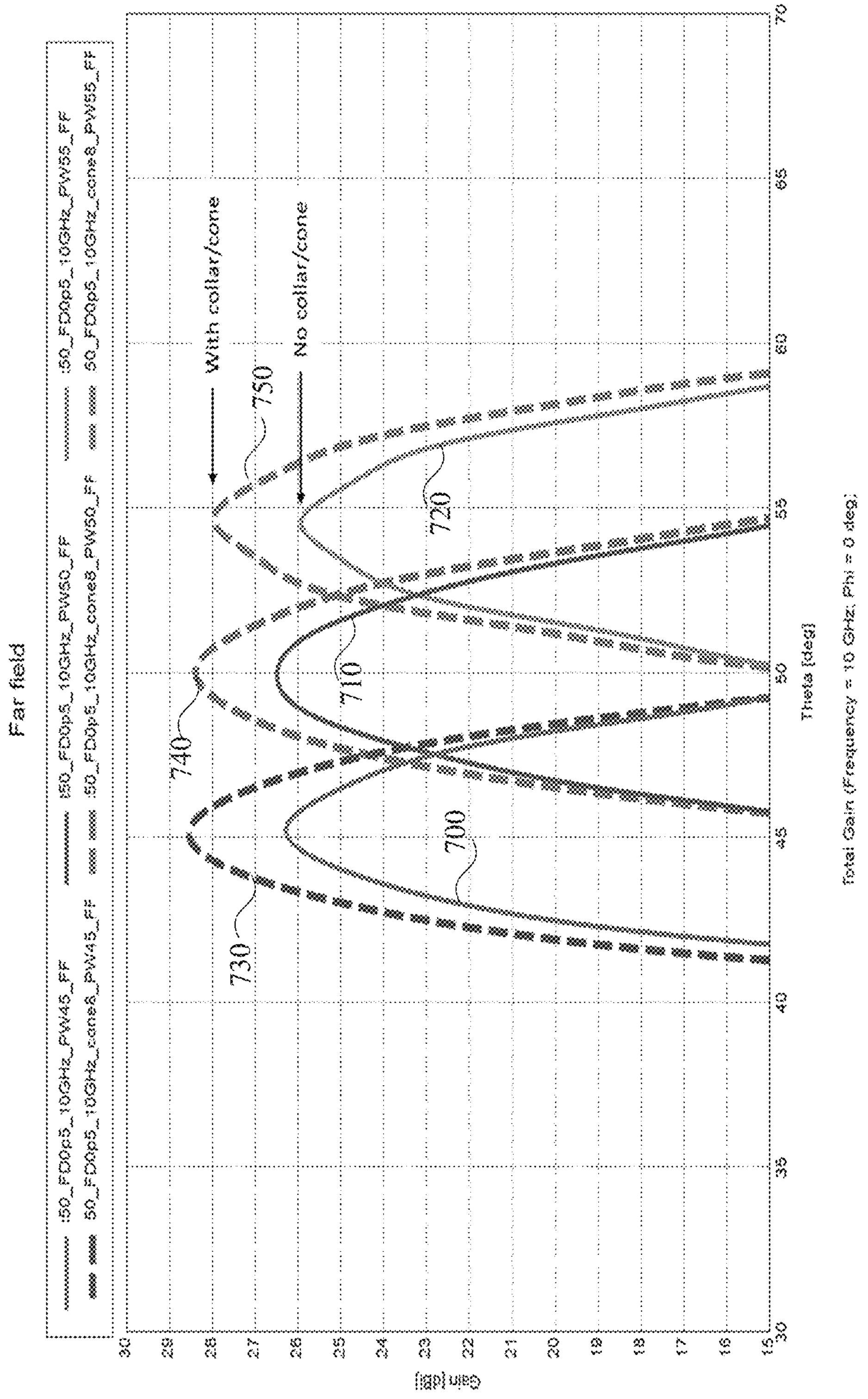
FIG. 7 is a graph depicting antenna gains for reflector antennas with and without a tapered collar at different scan angles according to aspects of the subject technology.

FIGS. 6A and 6B illustrate the reflections of a plane wave at a scan angle of 55 degree without and with a tapered collar according to aspects of the subject technology. Similar to the preceding figures, the plane wave reflects off of reflector 610 and ground plane extension 640 into phased array feed 620. FIG. 6B further includes tapered collar 650 arranged adjacent to phased array feed 620. As depicted, tapered collar 650 tapers outward away from phased array feed 620 and away from the longitudinal center axis (not shown). An inner surface of tapered collar 650 faces reflector 610 and ground plane extension 640 and is reflective. Tapered collar 650 is configured to reflect rays of the plane wave that strike the inner reflective surface into phased array feed 620. In comparing FIGS. 6A and 6B, it can be seen that phased array feed 620 can be made smaller in size when used in conjunction with tapered collar 650 by reflecting rays into phased array feed 620 that otherwise might bypass phased array feed 620 without tapered collar 650. FIG. 7 is a graph depicting the gains at scan angles of 45 degrees, 50 degrees, and 55 degrees without tapered collar 650 (lines 700, 710, and 720) and the gains at the same scan angles with tapered collar 650 (lines 730, 740, and 750). As shown in the graph a gain of approximately 2 dB can be obtained with the use of tapered collar 650.

Figure 8:
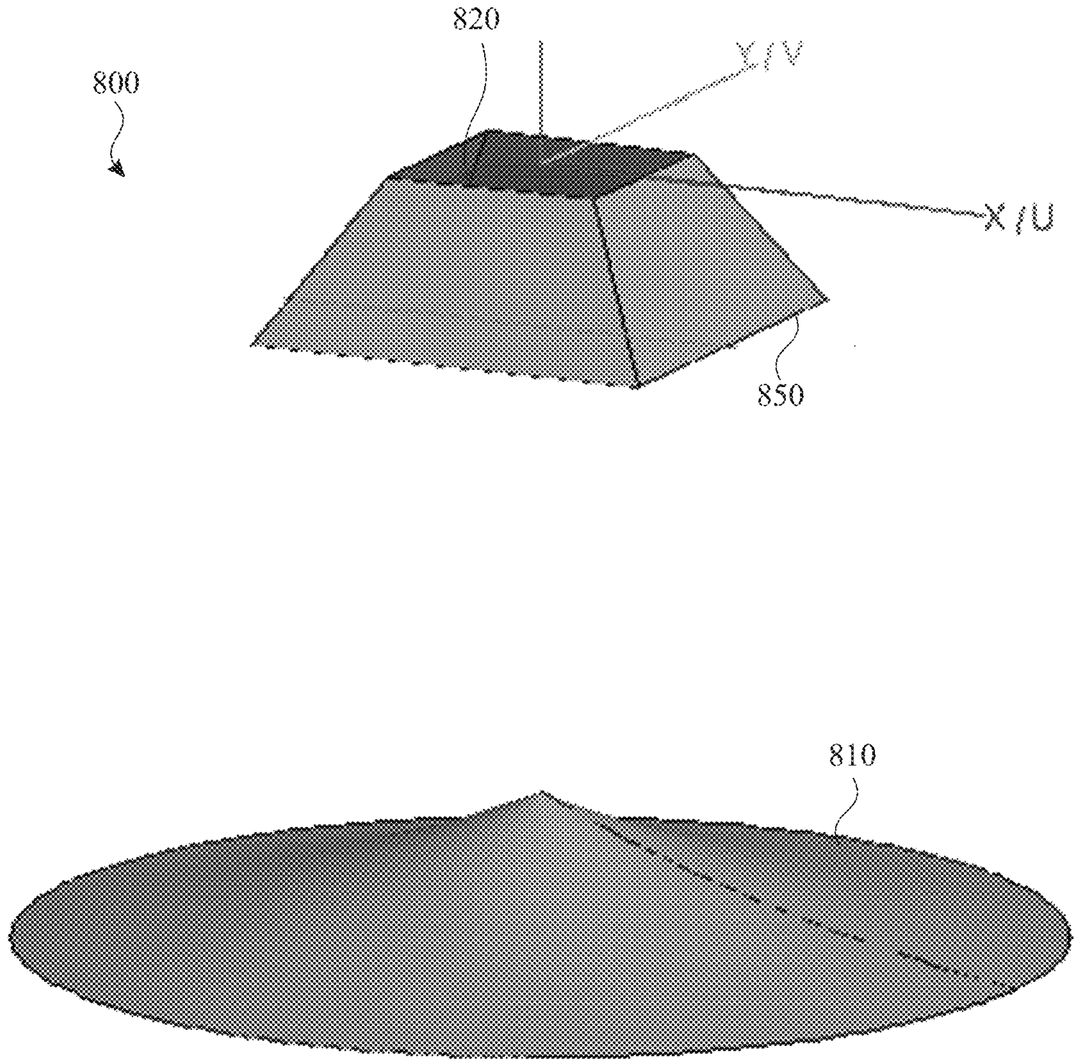
FIG. 8 is a diagram illustrating a reflector antenna according to aspects of the subject technology.

The tapered collar depicted in FIG. 1 is shown with a circular cross-sectional shape. The subject technology is not limited to this shape and may be implemented using other shapes. For example, the cross-sectional shape of the tapered collar may be designed to match the shape of the phased array feed. FIG. 8 is a diagram illustrating a reflector antenna according to aspects of the subject technology. As depicted in FIG. 8, reflector antenna 800 includes reflector 810, phased array feed 820, and tapered collar 850. In this example, phased array feed 820 may be configured in the shape of a square. To match the shape of phased array feed 820, tapered collar 850 may be designed to have a square cross-sectional shape as well. It is noted that the shapes of the phased array feed and the tapered collar need not match. In addition, the shapes of these components may be other shapes in addition to circular and square depicted in FIGS. 1 and 8.

FIGS. 1 and 8 depict reflector antennas with paraconic reflectors. The use of a tapered collar to improve the gain of the antenna is not limited to reflector antennas with paraconic reflectors. Tapered collars also may be used on reflector antennas with parabolic reflectors as well as reflector antennas that incorporate more than one reflector before plane waves reach the phased array feed. FIGS. 1 and 8 also depict reflector antennas that use a tapered collar without a ground plane extension extending away from the reflector. The subject technology makes us of tapered collars in reflector antennas both with and without ground plane extensions.

In FIG. 1, phased array feed 120 is depicted adjacent to and outside of the smaller opening of tapered collar 130. In FIG. 8, phased array feed 820 is depicted adjacent to and inside the smaller opening of tapered collar 850. The relative positions of the phased array feed and the tapered collar is not limited to these two examples and may vary depending on the design of the reflector antenna. The depth along the longitudinal center axis and the angle away from the longitudinal center axis of the tapered collar also may vary depending on the design of the reflector antenna. The angle may vary depending on the design of the reflector to deflect as many radiation beams as possible in the phased array feed. The depth of the tapered collar may extend as far as possible so long as the tapered collar does not block the radiation beams initially arriving at the reflector.

The subject technology is not limited in the types of materials used to make the reflector, ground plane extension, and/or tapered collar. These components may be made of a reflective metal such as aluminum or copper, for example. Alternatively, the components may be made of a different type of material such as carbon fiber, fiberglass, or plastic, for example, with a reflective coating applied to the reflective surface of the component. In addition, any of the reflector, ground plane extension, and the tapered collar do not need to be made out of the same material as the other components.

According to aspects of the subject technology, a reflector antenna is provided that includes a reflector having a curved reflecting surface that extends around a longitudinal center axis, wherein the curved reflecting surface is defined by rotating a concave curve around the longitudinal center axis and wherein one end of the concave curve defines an apex on the longitudinal center axis. The reflector antenna may further include a ground plane extension having a flat reflecting surface abutting an edge of the reflector and extending radially away from the longitudinal center axis, and a phased array feed arranged spaced apart from and opposite to the reflecting surfaces of the reflector and the ground plane extension.

The phased array feed may be centered on the longitudinal center axis. The ground plane extension may abut and encircle the periphery of the reflector. The ground plane extension may be circular in shape and concentric with the reflector. The ground plane extension may abut and extend from a portion of the periphery of the reflector less than all of the periphery of the reflector. The ground plane extension may be rectangular in shape. The reflector and the ground plane extension may comprise a single, continuous reflective surface.

The reflector antenna may further include a tapered collar adjacent to the phased array feed, wherein the tapered collar tapers outward away from the phased array feed towards the reflector and the ground plane extension, and wherein the tapered collar comprises an inner reflective surface facing the reflector and the ground plane extension. A cross-sectional shape of the tapered collar may match a cross-sectional shape of the phased array feed. The cross-sectional shape of the tapered collar may be circular. The cross-sectional shape of the tapered collar may be square.

According to aspects of the subject technology, a reflector antenna may be provided that includes a reflector having a curved reflecting surface that extends around a longitudinal center axis, wherein the curved reflecting surface is defined by rotating a concave curve around the longitudinal center axis and a phased array feed arranged spaced apart from and opposite to the reflective surface of the reflector. The reflector antenna may further include a tapered collar adjacent to the phased array feed, wherein the tapered collar tapers outward away from the phased array feed and towards the reflector, and wherein the tapered collar comprises an inner reflective surface facing the reflector.

A cross-sectional shape of the tapered collar may match a cross-sectional shape of the phased array feed. The cross-sectional shape may be circular. The cross-sectional shape may be square. One end of the concave curve may define an apex on the longitudinal center axis.

The reflector antenna may further include a ground plane extension having a flat reflecting surface abutting an edge of the reflector and extending radially away from the longitudinal center axis. The ground plane extension may abut and encircle the periphery of the reflector. The ground plane extension may be circular in shape and concentric with the reflector. The ground plane extension may abut and extend from a portion of the periphery of the reflector less than all of the periphery of the reflector. The ground plane extension may be rectangular in shape. The reflector and the ground plane extension may comprise a single, continuous reflective surface.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the terms include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A reflector antenna, comprising:

a reflector having a curved reflecting surface that extends around a longitudinal center axis, wherein the curved reflecting surface is defined by rotating a concave curve around the longitudinal center axis and wherein one end of the concave curve defines an apex on the longitudinal center axis;

a ground plane extension having a flat reflecting surface abutting an edge of the reflector and extending radially away from the longitudinal center axis, the reflector and the ground plane being configured to reflect radiation beams;

a phased array feed arranged spaced apart from and opposite to the reflecting surfaces of the reflector and the ground plane extension; and a tapered collar comprising an inner reflective surface facing the reflector and the ground plane extension, the tapered collar tapering outwardly away from the phased array feed and towards the reflector and the ground plane extension.

2. The reflector antenna of claim 1, wherein the phased array feed is centered on the longitudinal center axis.

3. The reflector antenna of claim 1, wherein the ground plane extension abuts and encircles the periphery of the reflector.

4. The reflector antenna of claim 3, wherein the ground plane extension is circular in shape and concentric with the reflector.

5. The reflector antenna of claim 1, wherein the ground plane extension abuts and extends from a portion of the periphery of the reflector less than all of the periphery of the reflector.

6. The reflector antenna of claim 5, wherein the ground plane extension is rectangular in shape.

7. The reflector antenna of claim 1, wherein the reflector and the ground plane extension comprise a single, continuous reflective surface of a same reflective material.

8. The reflector antenna of claim 1, wherein the tapered collar is positioned adjacent to the phased array feed.

9. The reflector antenna of claim 8, wherein a cross-sectional shape of the tapered collar matches a cross-sectional shape of the phased array feed.

10. The reflector antenna of claim 9, wherein the cross-sectional shape of the tapered collar is circular.

11. The reflector antenna of claim 9, wherein the cross-sectional shape of the tapered collar is square.

12. A reflector antenna, comprising:

a reflector having a curved reflecting surface that extends around a longitudinal center axis, wherein the curved reflecting surface is defined by rotating a concave curve around the longitudinal center axis, wherein one end of the concave curve defines an apex on the longitudinal center axis;

a phased array feed arranged spaced apart from and opposite to the reflective surface of the reflector; and a tapered collar adjacent to the phased array feed, wherein the tapered collar tapers outward away from the phased array feed and towards the reflector, and wherein the tapered collar comprises an inner reflective surface facing the reflector.

13. The reflector antenna of claim 12, wherein a cross-sectional shape of the tapered collar matches a cross-sectional shape of the phased array feed.

14. The reflector antenna of claim 12, further comprising:

a ground plane extension having a flat reflecting surface abutting an edge of the reflector and extending radially away from the longitudinal center axis.

15. The reflector antenna of claim 14, wherein the ground plane extension abuts and encircles the periphery of the reflector.

16. The reflector antenna of claim 15, wherein the ground plane extension is circular in shape and concentric with the reflector.

17. The reflector antenna of claim 14, wherein the ground plane extension abuts and extends from a portion of the periphery of the reflector less than all of the periphery of the reflector.

18. The reflector antenna of claim 17, wherein the ground plane extension is rectangular in shape.

19. The reflector antenna of claim 14, wherein the reflector and the ground plane extension comprise a single, continuous reflective surface of a same reflective material.

* * * * *